UNITED STATES PATENT OFFICE.

HENRY A. TILDEN, OF NEW LEBANON, NEW YORK.

IMPROVEMENT IN DISINFECTING-COMPOUNDS.

Specification forming part of Letters Patent No. 119,250, dated September 26, 1871.

*To all whom it may concern:*

Be it known that I, HENRY A. TILDEN, of New Lebanon, in the county of Columbia and State of New York, have invented an Improved Compound for Disinfecting and other purposes; and the following is declared to be a correct description thereof.

My compound is made with bromine, chlorine, and aluminium, and possesses powerful alterative, antiseptic, styptic, deodorizing, and disinfecting qualities. Chloride of aluminium has been heretofore employed for deodorizing and disinfecting. Bromine possesses powerful antiseptic, alterative, and deodorizing properties. I have discovered that when bromide of aluminium is combined with chloride of aluminium, as in my compound, the aforesaid properties are largely increased and developed, producing an article that has superior properties for the uses and purposes heretofore stated.

My compound is prepared by action of the sulphate of alumina upon the mixed solutions of chloride of calcium and bromide of magnesium, or other bromide salts, in the proportion of eight (8) parts of the chloride salt to one (1) part of the bromide salt, thereby producing chloride and bromide of aluminium with the sulphate of lime and sulphate of magnesia, or other salts, which latter salts are separated by precipitation and crystallization, and is based upon certain reciprocal chemical actions and combining chemical equivalents. It may be produced by direct combination of the several salts, or from any resulting waste products or water in chemical or industrial works, or from any natural waters that may contain bromine, chlorine, iodine, or any salts of the same. It may also be produced by the action of hydrochloric acid upon alumina combined with bromide of aluminium, which may be made either by the action of a bromide salt upon an alumina salt, or by the means of hydrobromic acid upon alumina.

I prefer to make this compound up in a liquid form, but it may be in the form of a salt and combined with an inert salt, such as sulphate of lime, to prevent deliquescence.

Iodine may be added to this compound as iodide of aluminium or its other salts; but I do not limit myself to its use, nor to the precise proportions of the bromide and chloride salts stated.

What I claim as my invention is—

The combination of bromide of aluminium with chloride of aluminium for disinfecting and deodorizing or other purposes, produced as herein described, or in any other manner substantially the same which produces the same intended results.

Signed by me this 29th day of July, A. D. 1871.

H. A. TILDEN.

Witnesses:
   A. H. BEMENT,
   JAMES WALLACE.

(29)